United States Patent
Gesler

[15] 3,662,976
[45] May 16, 1972

[54] SPEED CONTROLLER FOR AIRCRAFT

[72] Inventor: Hans G. Gesler, Neversdorf, Germany

[73] Assignee: Bodenseewerk Geratetechnik, Uberlingen (Bodensee), Germany

[22] Filed: May 7, 1969

[21] Appl. No.: 822,650

[52] U.S. Cl. .................................................. 244/77 D
[51] Int. Cl. ........................................... B64c 19/00
[58] Field of Search .............. 244/77, 77 D, 77 A; 235/150.2, 235/150.21, 150.22

[56] References Cited

UNITED STATES PATENTS 3,095,169  6/1963  Osder.................................244/77 D
3,327,972  6/1967  Greene...............................244/77 D
3,362,661  1/1968  Boothe et al........................244/77 D
3,522,729  8/1970  Miller................................244/77 D X

FOREIGN PATENTS OR APPLICATIONS 765,697  8/1967  Canada...............................244/77 D Primary Examiner—Milton Buchler
Attorney—Edward R. Hyde, Jr.

[57] ABSTRACT

An aircraft speed controller includes a program transmitter which provides a predetermined control program for application to a speed regulating means of the flight control and means for applying the control program to the regulating means upon the occurrence of a disturbance.

16 Claims, 5 Drawing Figures

Patented May 16, 1972

INVENTOR
HANS G. GESLER

BY
*Frank J. Thompson*

ATTORNEYS

INVENTOR
HANS G. GESLER

SPEED CONTROLLER FOR AIRCRAFT

The present invention relates to a speed control for aircraft. The invention relates more particularly to an aircraft speed control having a closed servo loop which is adapted for maintaining a desired air speed.

The design of an aircraft speed controller requires the satisfying of various technical requirements relating to the flight operation which at times are conflicting and difficult to reconcile. In the order of their significance, these requirements are:

1. The aircraft flight speed should be maintained above a certain minimum value when the aircraft is under the influence of flight disturbances.
2. During constant velocity flight the desired speed should be maintained with sufficient accuracy.
3. Throttle activity should be small.
4. The speed control response time should be short.

The first requirement prevents the aircraft speed from falling below the stall speed. This is the most essential requirement, since lift would cease at the stall speed. With a conventional closed servo loop, a prerequisite for satisfying this requirement is a fast acting controller having a short controlling time and an accompanying high cutoff frequency. This characteristic avoids an overshooting of the command speed when large and rapidly progressing disturbances occur. The second requirement necessitates the incorporation of a speed controller in the aircraft itself. The third requirement is satisfied by providing sufficiently large control damping for inhibiting control hunting and provision to assure that relatively high-frequency disturbances, such as wind gusts, do not cause high throttle activities. A control system constructed in accordance with this requirement would necessitate a relatively low cutoff frequency and, consequently, a relatively long control time which is contradictory to the first requirement. The term "disturbance" as used in this specification and the appended claims shall signify both an external disturbance such as a gust of wind as well as an intentionally caused change in the state of the aircraft, as for example, extension of the flaps or of the landing gear, as well as a change in the aircraft command speed.

Speed controllers of the prior art have been developed by compromising between these contradictory requirements. The most essential requirement of maintaining a speed above stall speed is satisfied for safety reasons. A requirement for a lowest possible throttle activity is thus sacrificed and the prior art speed controllers have not in practice exhibited the desired operating characteristics.

It is an object of the present invention to provide an improved speed controller for aircraft.

Another object of the present invention is to provide a speed controller for aircraft which satisfies a minimum speed requirement and results in very little throttle activity.

Another object of the invention is to provide a speed controller for aircraft which exhibits reactions substantially corresponding to those of a human pilot.

A further object of the invention is to provide an automatic pilot which satisfies the referred-to flight requirements.

In accordance with a general feature of the present invention, an aircraft includes a program transmitter which provides a predetermined control program for application to a speed regulating means of the flight control and means for applying the control program to the regulating means upon the occurrence of a disturbance. A speed controller according to the invention more particularly includes a closed servo loop for maintaining a constant flight speed. The occurrence of a disturbance will lead to a variation in aircraft speed from a desired command speed. This variation is sensed and an automatic adjustment of the throttle is effected through the servo loop until the variation is eliminated. A control in accordance with a program previously empirically found to be useful in counteracting the disturbance is provided and is applied to a speed regulating means when specific disturbances occur. The program control operates substantially independently of reactions in the performance of the aircraft caused by the program control.

For example, when the landing gear is extended, the aerodynamic drag of the aircraft will be increased. The thrust must be increased by an amount which has been previously determined by empirical methods. This required increase in thrust is stored as information in the program transmitter and since it is immediately available, can be utilized either immediately before or concurrently as the landing gear is extended. This is accomplished without awaiting the usual decrease in speed caused by the aerodynamic drag as the landing gear is extended and for the resulting deviation thus obtained which would successively initiate an increased thrust in the closed servo loop through the regulating means.

An optimum correcting response of a regulating means such as the engine throttle is empirically determined for specific disturbances and stored as a control program for application to the regulating means upon the occurrence of the disturbance. These disturbances would be difficult to correct with a prior art servo loop or could be satisfactorily corrected only when ignoring one of the aforesaid requirements. Because a stored control program is applied to the speed regulating means, the servo loop may be arranged to be independent of program control, as for example, in a manner for providing that high throttle activity due to gusts is avoided. The servo controller and program control thus function in a complementary manner with respect to each other.

The means for initiating operation of the program control in one embodiment responds to external disturbances operating on the servo loop. Alternatively, the disturbance to which the program application means responds is a change in the state of the aircraft initiated by the pilot. In this case it will be advantageous if the program control becomes operative by actuation of a regulating means initiating the change in the state of the aircraft. The program application means is further adapted to respond to changes occurring in the command signal of the servo loop, such as the command speed signal. It is particularly advantageous if the program application means respond only when a threshold value of the disturbance or a value derived from it such as by differentiation or taking the mean is exceeded.

In a further embodiment of the invention, the program control is arranged for providing that the program is variable in dependence on the disturbance or on a value derived from it. This may be accomplished by varying one or several of the parameters of a programmed thrust pulse in dependence on the disturbance or on a value derived from it. The thrust pulse parameters which can be varied are the time slope of the thrust pulse waveform, the maximum thrust amplitude, the duration of effect of the thrust pulse, and the difference in thrust in the stationary state at the beginning and at the end of the program. These characteristics can be varied for example with integrating and differentiating circuits for operating on the slope and with amplifiers and attenuators for operating on the thrust magnitude. A variation in the control program is also effected in dependence on variations in the state of the aircraft. The control program is varied additionally by other disturbances in a manner for providing that the total variation of the program parameters is a linear function of the various disturbances. Advantageously there is provided means for limiting the variable program parameters. The program parameters may be varied differently with a same magnitude of a disturbance but in dependence on the polarity or sense of the disturbance.

The operation of the program transmitter is accompanied by an inhibition of the servo controller signals. Alternatively the program control signals are superimposed on the signals from the controller. The disturbance to which the program control application means responds is the time derivative of the head wind component, averaged over a predetermined measuring time. The maximum amplitude of a programmed thrust pulse is thereby advantageously made proportional to the averaged time derivative of the head wind component by program-varying means. Moreover, the signal of a longitudinal accelerometer is connected in opposition to a differentiated dynamic pressure signal for forming a signal proportional to the time derivative of the head wind component.

These and other objects and features of the invention will become apparent with reference to the following specifications and the drawings wherein.

Figure 3:
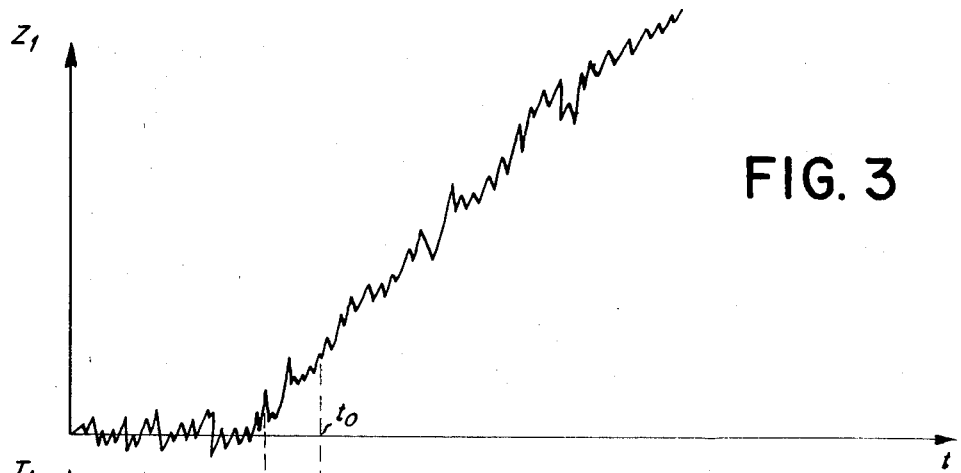
FIG. 3 is a diagram of the waveform of a disturbance.
Figure 4:
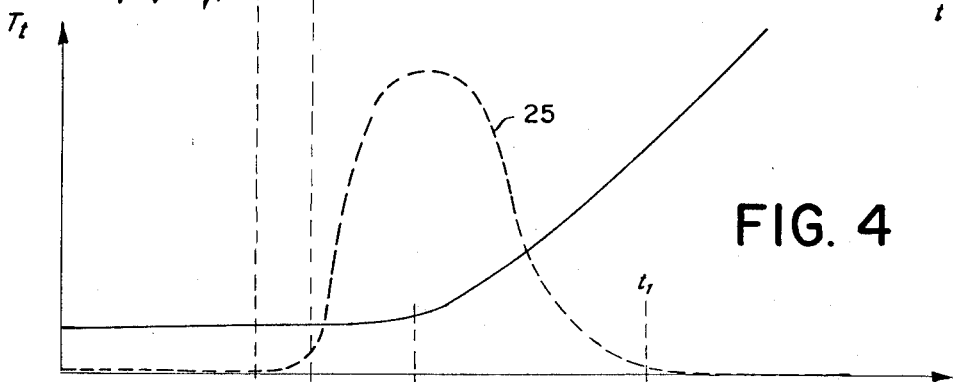
Figure 5:
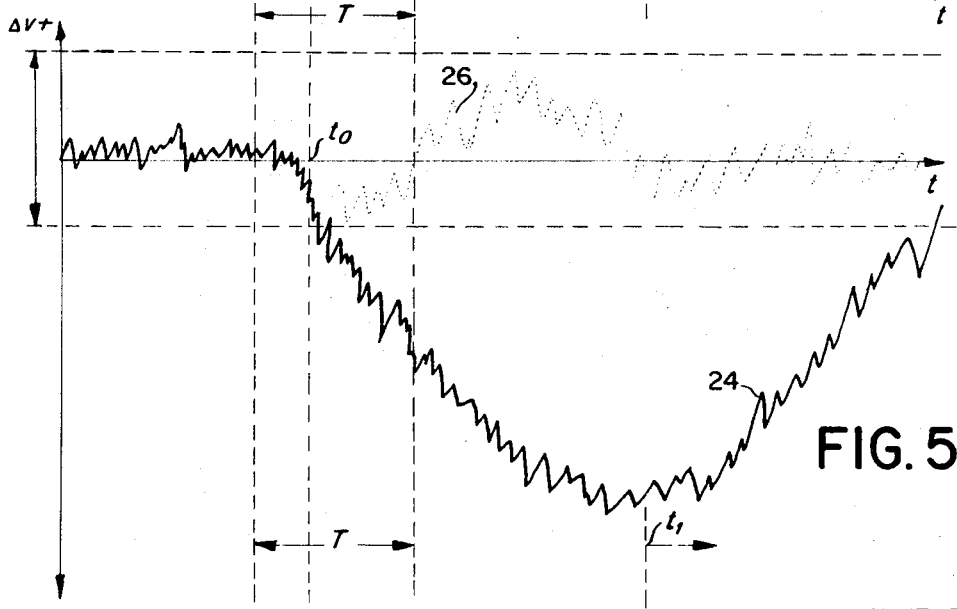

FIG. 4 is a diagram of the waveforms of a thrust pulse provided by the program transmitter, and of a thrust control signal which is generated by the servo controller alone in the closed servo loop; and FIG. 5 is a diagram of the waveforms of the aircraft speed deviation as it occurs with the controller in the closed servo loop, and for comparison the aircraft speed deviation for the disturbance of FIG. 3 resulting from the combined controller and program transmitter signals.

Figure 1:
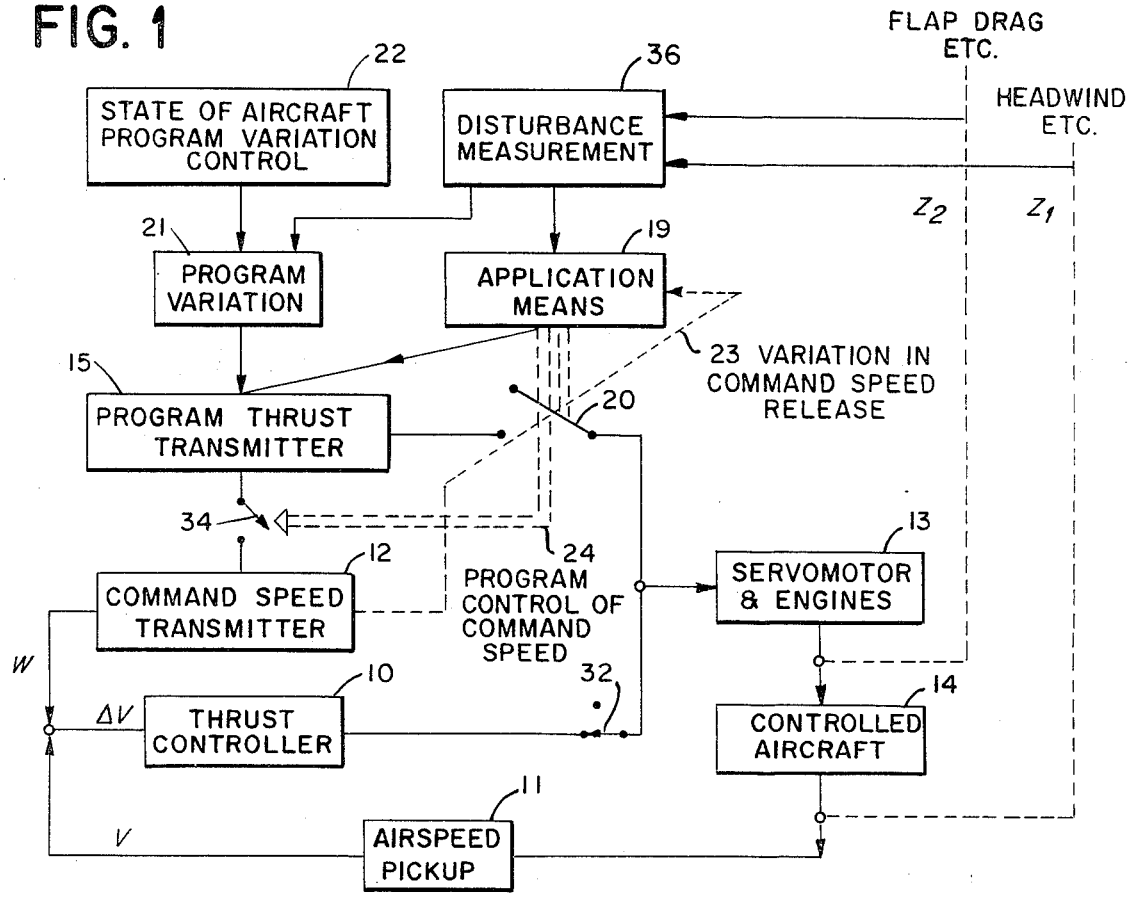
FIG. 1 is a diagram in block form of a speed controller illustrating an embodiment of the invention.

Referring now to FIG. 1, the speed controller according to the invention includes a controller 10 for controlling the speed of an aircraft 14 relative to the ambient air. A pickup 11 provides an electrical signal $v$ indicative of airspeed and the signal is compared with a command speed signal $w$ from a command speed transmitter 12. A difference signal $\Delta v$ is applied to the input of the controller 10 and represents the airspeed deviation from command speed. The controller 10 supplies a control signal to a servomotor by which, for example, the thrust of the engines is varied through the throttle. Servomotor and engines are represented by the block 13 in FIG. 1. The engines operate on the controlled system aircraft 14, and change its airspeed until $\Delta v$ is reduced to zero. This arrangement including the elements 10, 11, 12, 13 and the aircraft control surfaces comprises a closed servo loop.

Various disturbances act on this servo loop. The command speed $w$ from the command speed transmitter 12 may be varied. This leads to a deviation $\Delta v$, and the controller 10, through the servomotor and the engines 13 operate to reduce this deviation to zero and cause the aircraft speed to attain the new command speed. An external disturbance $Z_1$, representing for example head wind, may occur or a disturbance $Z_2$ which become effective between engine and aircraft in the diagram, as for example, a variation of the state of the aircraft, as the landing gear is extended and which causes an increase in the aerodynamic drag of the aircraft.

Figure 2:
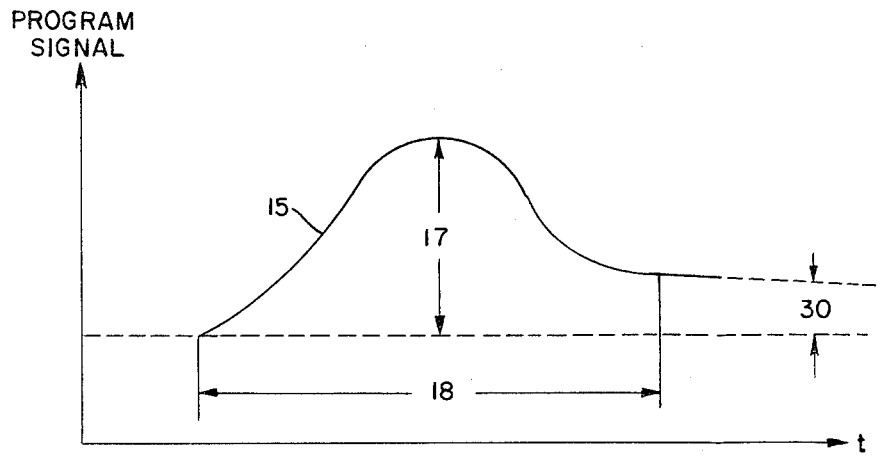
FIG. 2 is a diagram of a program control signal waveform illustrating a programmed thrust pulse, as provided by the program controller according to the invention.

In accordance with a feature of this invention, a stored program transmitter 15 is provided. This transmitter provides an output signal in accordance with a program representative of the thrust adapted for correcting aircraft deviations accompanying a disturbance. FIG. 2 illustrates a stored program thrust pulse. This pulse exhibits different parameters, including the principal time slope which is a form of bell-shaped curve 16, a maximum thrust amplitude 17, a duration of effect 18 of the thrust pulse, and the difference 30 between initial and final thrusts.

The stored program transmitter signal is applied to the regulating members 13 by a program signal application means 19. The program transmitter 15 is coupled to the servomotor and the engines 13 through a switch 20 illustrated symbolically, and the programmed control signal is shown to be superimposed on the signal from the servo loop controller 10. Alternatively the application of the program transmitter signal to the regulating means 13 is accompanied by inhibiting application of a control signal from the controller 10 to the regulating means by an interrupting switch 32. The application of the stored program signal to the regulating means 13 is effected when a disturbance is sensed. A means for sensing a disturbance is provided and is represented by the block 36. The sensing means 36 senses disturbances $Z_1$ and/or $Z_2$ and when a threshold value is exceeded the program application means 19 is actuated.

A means 21 is provided for varying the parameters enumerated hereinbefore of the stored program. A specific arrangement for varying these parameters is shown in co-pending U.S. Pat. application Ser. No. 820,424, filed Apr. 30, 1969, now U.S. Pat. No. 3,599,191 and assigned to the assignee of this application. This means is coupled to the disturbance sensing means 36 and is controlled for varying the program parameters in accordance with the intensity of the disturbance. The program variation is additionally effected in accordance with the state of the aircraft. A means for sensing the state of the aircraft is indicated by the block 22. The application of the stored program may also be effected by a variation in the command speed $w$, as indicated by the dashed line 23 representing an input to the program application means 19. The stored program control signal can be applied to the command speed transmitter, as is indicated by the line 24 and the switch 34 controlled thereby.

The operation of the control arrangement will now be explained with reference to FIGS. 3 through 5. In FIG. 3 a waveform of a disturbance is illustrated. The controller 10 includes a filter for increasing the thrust delay for providing that temporary gusts are prevented from immediately taking effect as thrust variations. Hence, the controller 10 exhibits a delay time T which is illustrated by the distance so referenced and plotted in FIG. 4. Thus, through the operation of controller 10 alone, a disturbance will be counteracted only, after the delay T and after the occurrence of an aircraft speed deviation having a time slope corresponding to the curve 24 in FIG. 5 during this interval T. However a programmed thrust pulse according to the curve 25 in FIG. 4 is applied to the regulating means 13 at time $t_o$ if the disturbance exceeds a predetermined threshold value. It becomes effective during the delay time T of controller 10 until the controller 10 becomes operative, and thereby maintains the deviation $\Delta v$ according to the graph 26 in FIG. 5 which is within the range of tolerance. An overshooting of the threshold value is therefore prevented. Subsequently, at time $t_1$, the controller 10 is then operative and functions to counteract the disturbance, while the programmed thrust pulse from the program transmitter 15 decays to zero.

By way of example, the disturbance $Z_1$ may be a varying head wind component $v_w$. From a control point of view, such "shear winds" are difficult to handle and dangerous in flight operation. The shear winds are difficult to handle, since the disturbance is reproduced with the same time slope in the controlled variable; that is, there are no energy storage elements disposed between the point of attack of the disturbance and the controlled variable $v$. Such shear winds are dangerous, because most of the time landing takes place in opposition to the wind direction prevailing on the ground, and in the normal case, the head wind component decreases with diminishing altitude. Therefore, the aircraft must be accelerated in order to avoid loss of lift at a constant angle of attack.

At low altitudes and for rapidly progressing variations of the head wind component:

$$v = v_g + v_w,$$

or $$dv/dt = dv_g/dt + dv_w/dt$$

wherein:

$v$ = indicated speed producing the lift, $v_g$ = basic speed, that is, speed in the system of coordinates stationary with respect to the flight path, $v_w$ = wind velocity, that is, the intensity of the wind velocity component lying in the direction of the flight path.

The measurement according to the invention of the disturbance $$dv_w/dt$$

is effected by the separate measurement of the speed $v$ with subsequent differentiation and of the variation in time of the basic speed $$dv_g/dt$$

by means of an accelerometer. The subsequent signal subtraction results in the disturbance $$dv_w/dt = dv/dt - dv_g/dt$$

The measured value of $dv_w/dt$ obtained, is averaged over a specific measuring time. Small values of $dv_w/dt$ lie below the responding threshold of the program releasing means 19 and are compensated with tolerable deviations by the "slow" controller 10. Only relatively large values of $dv_w/dt$ will release the program control.

The thrust amplitude 17 (FIG. 2) is thereby varied in dependence on $dv_w/dt$, in order to obtain a corresponding thrust lead with rapid wind variations.

In order to maintain the indicated speed $v$ constant
$$dv/dt \text{ must be} = 0$$
It follows from this that:
$$dv_o/dt + dv_w/dt = 0$$
If $P(t)$ is the thrust, then it follows
$$1/m\ p = -dv_w/dt$$
Therefore, with fixed programming of the other parameters of the thrust pulse (FIG. 2), the maximum thrust $P_o$ is preferably made proportional to the averaged $dv_w/dt$.

An aircraft speed control has thus been described which includes a servo control having a relatively slow response thereby reducing throttle activity and a program control means for providing a stored program control signal for compensating for the reduced response.

While I have illustrated and described a particular embodiment of my invention, it will be understood that various modifications may be made therein without departing from the spirit of the invention and the scope of the appended claims.

What is claimed is:

1. In a speed controller for aircraft having a closed servo loop including a controller to which is applied a signal representative of aircraft speed and regulating means for regulating the aircraft speed in response to a control signal from said controller, the improvement comprising means for storing a predetermined aircraft control program for application to the regulating means said means for storing being outside the said closed servo loop and means for sensing aircraft disturbance and application means controlled by said last named means for applying the control program to the speed regulating means upon the occurrence of a disturbance.

2. A speed controller as claimed in claim 1 wherein said sensing and application means is arranged for sensing a disturbance in the state of the aircraft which is initiated by an aircraft command and for applying the control program to said regulating means upon the occurrence of said disturbance.

3. A speed controller as claimed in claim 2 wherein said sensing and application means is adapted for applying said program to said regulating means automatically upon actuation of said regulating means initiating a change in the state of the aircraft.

4. A speed controller as claimed in claim 1 wherein said sensing and application means is adapted to respond to variations in a command signal $w$ of the servo loop.

5. A speed controller as claimed in claim 1 wherein said sensing and application means is responsive to a threshold value of the disturbance or a value derived from the disturbance.

6. A speed controller as claimed in claim 5 wherein said sensing and application means responds to a disturbance which is the time derivative of a head wind component averaged over a predetermined period of time.

7. A speed controller as claimed in claim 6 including means for providing a differentiated dynamic pressure signal and a longitudinal accelerometer providing an output signal thereof and coupled in opposition to the dynamic pressure signal for forming a signal proportional to the time derivative of the head wind component.

8. A speed controller as claimed in claim 1 wherein means are provided for varying said stored control program in dependence on the disturbance or on a value derived from it.

9. A speed controller as claimed in claim 8 wherein said program-varying means is adapted to vary a parameter of a stored program signal.

10. A speed controller as claimed in claim 9 wherein said program-varying means is adapted for causing the maximum amplitude of a stored program signal to be proportional to the average time derivative of a head wind component.

11. A speed controller as claimed in claim 8 wherein said program-varying means is adapted for varying the stored program in dependence on variation in the state of the aircraft.

12. A speed controller as claimed in claim 11 wherein said program-varying means is adapted for varying said program in response to variations in the state of the aircraft and other disturbances in a manner providing that the total variation of the program is a linear function of the various disturbances.

13. The speed controller of claim 12 wherein said program-varying means is adapted for limiting parameters of the variable program.

14. The speed controller of claim 12 wherein said program-varying means is adapted for varying the program parameters in a different manner upon the occurrence of disturbances having the same amplitude but opposite polarity.

15. A speed controller as claimed in claim 1 wherein said stored program is combined with a signal from said servo controller.

16. In a speed controller for aircraft having a closed servo loop including a controller to which is applied a signal representative of aircraft speed and regulating means for regulating the aircraft speed in response to a control signal from said controller, the improvement comprising means for storing a predetermined aircraft control program for application to the regulating means and means for sensing aircraft disturbance and for applying the control program to the speed regulating means upon the occurrence of a disturbance and means for inhibiting the application of signals from the servo controller to the regulating means when the stored programmer is applied to the regulating means.

* * * * *